Patented Nov. 24, 1931

1,833,685

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

PROCESS OF CHLORIDIZING METALLIFEROUS MATERIALS

No Drawing.      Application filed April 25, 1930. Serial No. 447,418.

This invention relates to chloridizing processes for the treatment of metalliferous materials.

It is among the objects of the invention to provide chloridizing processes for treating metalliferous materials, especially those containing oxide, by which the metal values are converted to readily soluble chlorides, which provide high extraction yields, are direct, readily practiced, and more simple than those used at present, and which are especially applicable to efficient and economical extraction of low grade materials.

The invention is predicated upon my discovery that metal oxides, particularly those in a reduced form, may be converted to chlorides direct by treatment of the oxide metalliferous material in a quasi-wet condition with gaseous chlorine or hydrogen chloride. Thus, zinc oxide may be readily and quickly converted to chloride by subjecting quasi-wet material containing it to the action of chlorine or hydrogen chloride, and iron chlorides may be similarly formed, especially from iron oxides in a lower stage of oxidation. Also, in accordance with the invention, chlorides formed in this manner, such as those of iron, exert a powerful chloridizing effect upon other metals, particularly when they are thermally broken down to oxide, as will be more fully explained hereinafter.

As used herein the term "quasi-wet" is applied to concisely refer to a dampened condition of the material in which the particles are moistened with liquid, but in which there is insufficient liquid present to occupy the interstices between the particles, or to seep or percolate through the ore mass. This degree of moistening does not, in general, cause agglomeration of the particles, and the surfaces of all particles are exposed to the action of the chlorine. There is a maximum moisture content, varying with different ores, above which the ore volume diminishes rapidly and the particles agglomerate as the voids between them begin to be occupied materially with liquid. This provides a ready test of the quasi-wet condition.

A particular benefit of the application of this principle of quasi-wetting resides in the fact that the small amount of liquid used is quickly and readily saturated with the chlorine or hydrogen chloride used, thus forming a concentrated reagent solution in intimate contact with all parts of the particles. It likewise may act to dissolve the chlorides as they are formed, not only to keep fresh surfaces exposed to attack by the reagent gas, but also to permit reaction of the chloride upon other constituents of the material.

The invention is especially applicable to metalliferous materials containing oxide, and particularly to those containing iron. It is applicable to such materials generally, for example, ores, mine dumps, and the like.

In its preferred embodiments the materials are finely divided, and the finer the material, the more rapid and profound the attack by chlorine or hydrogen chloride will be. In most instances, division to pass 100 or 140-mesh will suffice, although material of 200-mesh or finer may be used, reference being here made to the sieve specifications adopted by the U. S. Bureau of Standards.

In the practice of the invention with materials largely in the form of oxides, the material is treated with liquid in an amount sufficient to render it quasi-wet, and the quasi-wet material is then treated with chlorine or hydrogen chloride, after which the metal values may be extracted with simple solvents. With some materials the chloridizing action is so rapid and profound as to cause heating of the material, but in the case of materials containing small amounts of metals, it is advisable to heat gently during treatment. In the specification and claims it will be understood that when chlorine is referred to, hydrogen chloride or mixtures containing chlorine and hydrogen chloride may be used.

Any suitable liquid may be used to render the material quasi-wet, the preferred liquid being water. However, reagent liquids, such as aqueous solutions of chlorine or sodium chloride, may also be used. Satisfactory recoveries are obtained with oxide materials by treating with chlorine in an amount sufficient to saturate the ore mass.

Where the oxide material to be treated contains sulfide sulfur, it is usually necessary to break up the sulfide molecule in order to obtain complete recovery of the metal values. This may be effected by exposure of the quasi-wet material to an oxidizing atmosphere, for example air, after treatment with chlorine.

I have found, however, that when iron chlorides in such materials are decomposed by heat the sulfide radical in the ore is readily broken down and the metal converted to chloride by the hot nascent hydrogen chloride and chlorine formed in breaking down iron chloride. The sulfur is largely or wholly volatilized as hydrogen sulfide, sulfur vapor, or sulfur compounds of chlorine, from which elemental sulfur may be recovered.

Most metalliferous materials contain iron in quantities sufficient to produce this action, and because the reactions are rapid and effective, this procedure is preferred for conversion to readily soluble chlorides of the metallic sulfides. A further benefit of this procedure resides in conversion of iron chlorides to oxides which are insoluble in the simple solvents used to leach out the metal value chlorides. This reduces contamination of the leach liquors and materially simplifies their subsequent treatment.

Although especially applicable to oxide materials, the benefits of the invention are equally obtainable with high sulfide ores by subjecting the material to an oxidizing roast and then treating it in the manner described hereinabove.

The addition of a halide, preferably a chloride, such as common salt, to the material before heat treatment is beneficial, because it provides for production of chlorine or chlorides during heating. In this manner the amount of chlorine needed may be reduced, and sufficient chlorine to complete chloridizing of the metal values is provided.

Heat treatment is preferably conducted in a muffle furnace, using a limited amount of air, or no air at all, at a temperature sufficient to decompose the iron chloride. Reaction will generally begin at about 100° C., and in the preferred embodiment the material is heated at about 100° to 200° C. for a period of time varying with the type of material being treated. If sufficient iron chloride is present, any metal present as residual sulfide is converted to chloride during this treatment. Hydrogen chloride and steam are evolved during this heating, and because the former is liberated in a nascent condition, it exerts a powerful action on the metal values, whether present as metal or as sulfide, oxide, carbonate, silicate, or the like. The reactions probably are:

Moist iron chlorides + heat = iron oxides + nascent (HCl + Cl)

$$MS + 2HCl = MCl_2 + H_2S$$

When the sulfides have been broken up, the temperature is raised to about 200° to 300° C., and, in general, two hours heating at this temperature suffices, during which time further amounts of hydrogen chloride, and some chlorine will be given off. The reactions are completed by heating at about 400° to 550° C. Higher temperatures may be used, but as a rule they are unnecessary, and they may be undesirable, in that the chlorides may be converted to insoluble compounds.

In many cases the heat treatment may be completed at the lower temperatures by conducting the heating at that temperature under pressure. I have found that in this manner practically all of the hydrogen chloride and chlorine can be combined with iron oxides, especially oxides in a reduced form. The ferrous chloride thus formed then acts as a strong chloridizing agent. Other metal compounds are also attacked and made soluble, and the procedure is especially efficacious in rendering refractory gold and silver ores, and zinc complexes, amenable to extraction. It also further reduces the amount of chlorine needed. In general, this procedure may be practised under pressures of from about 1 to 5 pounds gauge, at temperatures from about 100 to 150° C., although the reactions will be more rapid at higher pressures and temperatures.

After treatment such metals as copper, manganese, cadmium, cobalt, nickel, etc. may be leached out with water, and lead with dilute caustic soda solution. Silver may be extracted with hyposulfate or cyanide, but where gold is present it is sometimes attacked only partially during treatment, and it will usually be more desirable to cyanide these metals after leaching out the base metals. Where considerable amounts of zinc are present it is advisable to leach out the zinc chloride formed before heat treatment.

*Example 1.*—A sulfide ore containing about 20 per cent of copper, 12 per cent of antimony and 8 ounces of silver per ton, together with iron and other usual impurities, was ground to 200-mesh, roasted 3½ hours below 475° C., rendered quasi-wet with water to hydrate the salts which had formed in roasting, and roasting was then completed. The roasted ore was then ground to approximately 200-mesh, after which it was placed in cold 4 per cent $H_2SO_4$ solution and agitated with air for 6 hours, followed by thorough washing with water to remove the bulk of the copper. The ore was then dried until its water content was just sufficient to render it quasi-wet, when it was mixed with 3 per cent by weight of sodium chloride and treated with chlorine, followed by heating in a closed muffle for 3 hours at 100° to 150° C., during which time considerable steam and hydrogen chloride evolved, together with a little chlorine. The ore was turned over every 10 minutes, air being simultaneously admitted for one minute. The temperature was then increased during 3 hours to about 400° to 450° C., and at the end of this time diminished evolution of fume showed that the decomposition of iron chlorides was practically complete. When cool the ore was leached with hot water, thus obtaining a total extraction of more than 99 per cent of the copper, and practically all of the silver was soluble in ammonia. Part of the antimony was soluble in dilute caustic soda solution.

A particularly effective manner of practising the invention is to pass the material to the top hearth of a multiple hearth muffle type furnace arranged for up draft. As the material passes over the lower hearths it is subjected to the heat treatment described, and the gases liberated pass upwardly over incoming material. The steam in the gases is condensed on the incoming material, and the hydrogen chloride and chlorine in the gases combine with the now quasi-wet ore to form iron chlorides which, as the material reaches the hotter part of the furnace, are in turn broken down, liberating chlorine and hydrogen chloride which pass upwardly and react with new amounts of material. By suitable regulation of heat the material discharged from the furnace is ready for leaching.

As previously mentioned, iron is beneficial to the processes provided by the invention. The invention is particularly applicable also to materials having a high iron content, and not only are sulfur and the metal values, such as manganese and nickel removed, but also metalloids, such as phosphorous. The heat treatment converts iron chlorides formed in processing to oxides, and the residual material consists of practically pure iron oxide and silica. Accordingly the invention provides for efficient beneficiation of iron ore materials, to adapt both low and high grade iron ores for the production of purer irons and steels.

*Example 2.*—As showing the applicability of the invention to beneficiation of iron ores, the following actual test is cited. An ore containing 25 to 30 per cent of sulfur, about 40 per cent of iron, 3.64 per cent of nickel, 0.26 per cent of copper, and 0.3 per cent of cobalt, with small amounts of arsenic and phosphorous, was ground to 200-mesh, roasted 3½ hours below 475° C., reground to approximately 200-mesh, and leached with cold 4 per cent $H_2SO_4$ solution, followed by washing with water, to wash sulfates out completely. The ore was then dried until it contained about 15 per cent of water, which rendered it just quasi-wet, and it was then treated with chlorine. The ore was stirred and owing to the evolution of a large amount of heat it was necessary to restrict the rate of chlorine addition.

The ore was then heat treated in the same manner as that described in Example 1, and after leaching with hot water analysis of the residue showed practically all of the sulfur and phosphorous to have been removed, and that its content of metallic impurities was:

| | Per cent |
|---|---|
| Copper | 0.02 |
| Cobalt | 0.08 |
| Nickel | 0.11 |

The leach liquor contained practically all of the copper, cobalt and nickel, and it showed only a trace of iron.

The chloridizing reactions in the processes provided by the invention are vigorous and profound, and the invention thus provides processes in which chloridizing is effected directly, simply and at low cost, to obtain high or substantially complete recoveries of the metal values.

Further economies may be effected by reuse of the hydrogen chloride liberated in heat treatment. It may be returned to the system to act upon fresh material, as a substitute for part or all of the chlorine, or it may be converted to chlorine by well known methods. For example, the fume may be passed over heated bricks saturated with copper chloride, this mode of producing chlorine being sufficiently effective for this purpose.

The process of beneficiating iron ores is claimed in a copending application filed by me of even date herewith.

According to the provisions of the patent statutes, I have explained the principle and mode of operation of my invention, and have described what I now consider to represent its best embodiments. However, I desire to have it understood that, within the scope of the appended claims, the invention may be practiced otherwise than as specifically described.

I claim:

1. A process of chloridizing oxide ore in steps, comprising applying liquid to the finely divided ore to bring it to quasi-wet condition, treating it while quasi-wet with chlorine to form metal chloride distributed therein, then treating with restricted amounts of air at temperatures between 100° C. and 200° C., and then heating it with chlorine and steam to above 350° C. to continue the chloridization.

2. A process of gradual chloridization of oxide ore containing iron, comprising applying liquid to the finely divided ore to bring it to quasi-wet condition, treating it while quasi-wet with chlorine to form iron chlorides distributed therein, then heating it gradually with restricted amounts of air to about 150° to 200° C., and continuing the heating to above 350° C. in the presence of chlorine and steam to continue the chloridization.

3. A process of chloridizing sulfide ore containing iron, comprising converting the ore to oxide, then at normal temperatures applying liquid to the finely divided ore to bring it to quasi-wet condition, treating it while quasi-wet with chlorine to form iron chlorides distributed therein, then agitating the ore with restricted amounts of air at temperatures between 100° C. and 200° C., and continuing the heating to above 350° C. while introducing chlorine and steam to continue the chloridization.

In testimony whereof, I sign my name.

RALPH F. MEYER.